US009564981B2

(12) United States Patent
Fujita et al.

(10) Patent No.: US 9,564,981 B2
(45) Date of Patent: Feb. 7, 2017

(54) AUDIO MIXING CONSOLE

(75) Inventors: Hiroaki Fujita, Hamamatsu (JP); Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 234 days.

(21) Appl. No.: 13/187,486

(22) Filed: Jul. 20, 2011

(65) Prior Publication Data

US 2012/0023406 A1 Jan. 26, 2012

(30) Foreign Application Priority Data

Jul. 21, 2010 (JP) ................................ 2010-164122

(51) Int. Cl.
*G06F 3/00* (2006.01)
*H04H 60/04* (2008.01)
*G06F 3/01* (2006.01)

(52) U.S. Cl.
CPC .................................... *H04H 60/04* (2013.01)

(58) Field of Classification Search
CPC ........ G06F 3/16; G06F 3/0481; G06F 9/4443; G06F 9/4446; G06F 3/04895
USPC ........ 715/758, 751, 753, 762, 727; 345/184, 345/172
See application file for complete search history.

(56) References Cited

U.S. PATENT DOCUMENTS 5,559,301 A * 9/1996 Bryan et al. .................... 84/653
5,990,890 A * 11/1999 Etheredge ..................... 715/808
6,215,490 B1 * 4/2001 Kaply ........................... 715/788
6,452,612 B1 * 9/2002 Holtz .................... G06F 3/1431 348/722
6,981,224 B1 * 12/2005 Gardner et al. .............. 715/760
7,996,873 B1 * 8/2011 Nathan et al. .................. 725/91
8,103,964 B2 * 1/2012 Okabayashi .................. 715/767
8,253,747 B2 * 8/2012 Niles et al. ................... 345/474
8,332,757 B1 * 12/2012 Davey et al. ................. 715/716
2004/0030425 A1 * 2/2004 Yeakel et al. ................ 381/119
2004/0073419 A1 * 4/2004 Aoki et al. .................... 704/201
2004/0184626 A1 * 9/2004 Hagiwara ..................... 381/119
(Continued)

FOREIGN PATENT DOCUMENTS

JP 2007-074623 A 3/2007
WO WO-03/087980 A2 10/2003

OTHER PUBLICATIONS

Yamaha Corp. (2005). Digital Mixing Console M7CL, English language, 282 pages.
(Continued)

*Primary Examiner* — Toan Vu
(74) *Attorney, Agent, or Firm* — Morrison & Foerster LLP

(57) ABSTRACT

Mixer includes first and second displays each capable of displaying a pop-up screen that simultaneously displays pieces of information of eight channels. Once a display instruction for displaying a pop-up screen is received, it is ascertained whether or not the pop-up screen currently instructed to be displayed can be displayed on both of the first and second displays. If the pop-up screen can be displayed on only one of the displays, the currently instructed pop-up screen and one-screen channel selection switch are displayed on the one display together with. If, on the other hand, the pop-up screen can be displayed on both of the displays, the instructed pop-up screen are displayed on in a two-screen format on individual ones of the displays, and a two-screen channel selection switch is displayed on each one of the pop-up screens.

3 Claims, 4 Drawing Sheets

(56) References Cited

U.S. PATENT DOCUMENTS

2005/0024345 A1* 2/2005 Eastty et al. .................. 345/173
2005/0054305 A1* 3/2005 Hagiwara .............. H04H 60/04 455/126
2005/0190933 A1* 9/2005 Hamada et al. .............. 381/119
2005/0256595 A1* 11/2005 Aiso et al. ...................... 700/94
2006/0015198 A1* 1/2006 Okabayashi et al. ........... 700/94
2006/0101338 A1* 5/2006 Kates ........................... 715/716
2006/0204021 A1* 9/2006 Okabayashi et al. ......... 381/103
2006/0215857 A1* 9/2006 Hirano .................. H04H 60/04 381/119
2007/0061729 A1* 3/2007 Terada .......................... 715/727
2007/0150833 A1* 6/2007 Kim .............................. 715/808
2007/0156910 A1* 7/2007 Christie et al. ............... 709/227
2007/0209002 A1* 9/2007 Terada et al. ................. 715/705
2007/0229474 A1* 10/2007 Okabayashi .................. 345/173
2007/0250794 A1* 10/2007 Miura ................... G06F 3/0482 715/810
2008/0104527 A1* 5/2008 Jaeger ........................... 715/763
2008/0168377 A1* 7/2008 Stallings ............. H04L 12/4625 715/772
2008/0281451 A1* 11/2008 Aoki et al. ...................... 700/94
2009/0006956 A1* 1/2009 Bae et al. ..................... 715/708
2009/0028359 A1* 1/2009 Terada et al. ................. 381/119
2009/0214059 A1* 8/2009 Hamada et al. .............. 381/119
2009/0228801 A1* 9/2009 Lee et al. ...................... 715/730
2009/0271723 A1* 10/2009 Matsushima et al. ........ 715/769
2009/0327948 A1* 12/2009 Penttinen et al. ............ 715/780
2010/0100842 A1* 4/2010 Kim .............................. 715/808
2010/0103177 A1* 4/2010 Shinohara et al. ........... 345/440
2010/0105362 A1* 4/2010 Yang .......................... 455/414.1
2010/0251168 A1* 9/2010 Fujita et al. .................. 715/790
2010/0281377 A1* 11/2010 Meaney ............... G11B 27/034 715/723
2010/0281386 A1* 11/2010 Lyons ..................... G06F 3/048 715/731
2010/0306648 A1* 12/2010 Wilairat ........................ 715/702
2011/0164058 A1* 7/2011 Lemay .......................... 345/651
2013/0124992 A1* 5/2013 Lyons .................. G11B 27/034 715/716
2013/0218688 A1* 8/2013 Roos .......................... 705/14.69
2015/0317048 A1* 11/2015 Sagar .................... G06F 3/0482 715/834

OTHER PUBLICATIONS

Yamaha Corp. (2005). Digital Mixing Console M7CL, Japanese language, 282 pages.

Extended European search report dated Jan. 8, 2014, for EP Application No. 11173742.5, eight pages.

* cited by examiner

AUDIO MIXING CONSOLE

BACKGROUND

The present invention relates to audio mixing consoles operable by a user to perform various operation pertaining to signal processing on audio signals of a plurality, of channels, and more particularly to an audio mixing console which displays a pop-up screen in a display area provided on an operation panel.

Among the conventionally-known digital audio mixers are ones which include a display provided on a console (operation panel), and in which a base screen is opened on the display and in which, for a plurality of channels, primary ones of various setting parameters are displayed in a predetermined arrangement on the base screen. On the base screen, a user can adjust values of the displayed parameters while checking balance among the plurality of channels. Further, among the conventionally-known digital audio mixers are ones in which a pop-up screen is opened on the base screen, and in which, for a particular signal processing function, values of various setting parameters are displayed in detail. Thus, on the pop-up screen, a user can adjust in detail the values of the various setting parameters of the particular signal processing function (see Japanese Patent Application Laid-open Publication No. 2007-74623). Furthermore, an example of the pop-up screen is disclosed "DIGITAL MIXING CONSOLE M7CL Instruction Manual", pp. 105-106, in 2005, Yamaha Co., (available on the Internet at http://www2.yamaha.co.jp/manual/pdf/pa/japan/mixers/m7cl_ja_om_e0.p df), on which can be simultaneously displayed and edited various setting parameters of a particular signal processing function pertaining to eight channels selected via a channel selection switch.

The assignee of the present invention proposed a construction where two displays are displayed adjacent to each other on an operation panel of a mixer. In the proposed construction, if a pop-up screen displaying pieces of information of eight channels is displayed on each one of the two displays, then pieces of information of a total of 16 channels can be displayed and edited using the two pop-up screens displayed on the two displays.

In the case where the pieces of information of the 16 channels are displayed using the two pop-up screens as noted above, and when a group of the channels to be displayed on the pop-up screens are to be changed, the user has to perform channel selection operation separately per pop-up screen if the mixer is constructed in such a manner that the channel selection must be made per pop-up screen (i.e., a channel selection unit is one pop-up screen) as in the traditional mixer. Thus, the channel selection operation would take a lot of time and labor, resulting in inconveniences to the user.

Further, even in the construction where the two pop-up screens are used, all of the 16 channels are not always displayed together using the two pop-up screens. In other words, the group of the 16 channels displayed on the two pop-up screens is not always changed together or collectively, and thus, it is not preferable and not sufficient to merely uniformly make the channel selection unit two screens (i.e., 16 channels).

Namely, in the construction where the plurality of pop-up screens can be displayed together by use of the plurality of displays, the optimal channel selection unit (i.e., unit number of channels) tends to vary in accordance with usage situations of a pop-up screen to be currently displayed. Thus, the conventionally-known technique was not sufficient for the user to readily, promptly and accurately select a group of channels that is to be displayed on the pop-up screens.

SUMMARY OF THE INVENTION

In view of the foregoing, it is an object of the present invention to provide an improved audio mixing console in which a plurality of pop-up screens can be displayed together by use of a plurality of displays (display areas), and which allows channel selection operation to be readily, promptly and accurately performed on the pop-up screens.

In order to accomplish the above-mentioned object, the present invention provides an improved audio mixing console for performing operation pertaining to signal processing on audio signals of a plurality of channels, which comprises: a plurality of display areas disposed on an operation panel of the audio mixing console, each one of the plurality of display areas being capable of displaying a pop-up screen that simultaneously displays pieces of information of a predetermined plurality of the channels; a display instruction section which, for each of the display areas, receives a display instruction for displaying a pop-up screen; an ascertainment section which, in response to receipt of the display instruction, ascertains whether or not the pop-up screen currently instructed to be displayed can be displayed on the plurality of display areas; a pop-up screen display control section 1) which, when the currently instructed pop-up screen can be displayed on only one of the plurality of display areas, not only displays the currently instructed pop-up screen in a one-screen format on the one of the plurality of display areas for which the display instruction has been received, but also displays, on the pop-up screen displayed on the one of the plurality of display areas, a one-screen channel selection switch for selecting a predetermined plurality of the channels that are to be displayed on the pop-up screen displayed on the one of the plurality of display areas, and 2) which, when the currently instructed pop-up screen can be displayed on the plurality of display areas, not only displays the currently instructed pop-up screen in a plurality of-screen format on individual ones of the plurality of display areas, one pop-up screen on each of the display areas, but also displays, on each one of the pop-up screens displayed in the plurality of-screen format on the individual ones of the plurality of display areas, a plurality-of-screen channel selection switch for collectively selecting a predetermined plurality of the channels that are to be displayed on the pop-up screens displayed on the individual ones of the plurality of display areas; and a channel selection section which, in response to operation of the one-screen channel selection switch, changes displayed content of the pop-up screen, displayed in the one-screen format on the one of the plurality of display areas, into pieces of information of the predetermined plurality of the channels selected through the operation of the one-screen channel selection switch, and which, in response to operation of the plurality-of-screen channel selection switch, changes displayed content of the pop-up screens, displayed in the plurality-of screen format on the individual ones of the plurality of display areas, into pieces of information of the predetermined plurality of the channels selected through the operation of the plurality-of-screen channel selection switch.

When the currently instructed one pop-up screen is displayed in the one-screen format, a channel selection switch for one screen (i.e., one-screen channel selection switch) is displayed, while, when the currently instructed one pop-up screen is displayed in the plurality-of-screen format, one pop-up screen on each of the display areas, a channel selection switch for a plurality of screen (i.e., plurality-of-screen channel selection switch) is displayed on each of the pop-up screens displayed in the plurality-of-screen format. Thus, it is possible to always keep optimal the channel selection unit in accordance with usage situations of a pop-up screen to be currently displayed. While the instructed pop-up screen is being displayed in the plurality-of-screen format, one pop-up screen on each of the display areas, (i.e., while a plurality of the pop-up screens are being displayed), a user can collectively change pieces of information of the predetermined plurality of the channels to be displayed on the plurality of the pop-up screens, by merely operating the plurality-of-screen channel selection switch on only one of the plurality of pop-up screens. Therefore, in the construction where the plurality of pop-up screens can be displayed together using the plurality of display areas, the user can readily, promptly and accurately select a multiplicity of channels to be displayed on the plurality of pop-up screens, without paying attention to or without becoming conscious of the channel selection unit.

The present invention may be constructed and implemented not only as the apparatus invention as discussed above but also as a method invention. Also, the present invention may be arranged and implemented as a software program for execution by a processor such as a computer or DSP, as well as a storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
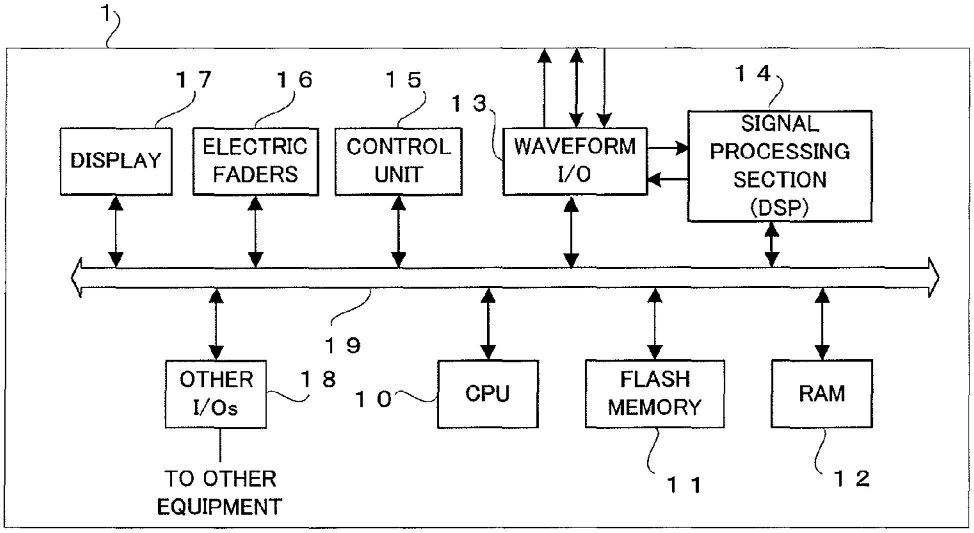
FIG. 1 is a block diagram showing a general hardware setup of a digital audio mixer to which is applied en embodiment of an audio mixing console of the present invention.

FIG. 1 is a block diagram showing a general hardware setup of a digital audio mixer (hereinafter referred to simply as "digital mixer" or "mixer") to which is applied en embodiment of an audio mixing console of the present invention. The digital mixer 1 includes a CPU (Central Processing Unit) 10, a flash memory 11, a RAM (Random Access Memory) 12, a waveform input/output interface (hereinafter referred to as "waveform I/O") 13, a signal processing section (DSP (Digital Signal Processing) section) 14, a control unit 15, an electric fader group 16, a display device 17 and other I/Os 18, and these components are interconnected via a bus 19.

The CPU 10 controls general behavior of the digital mixer 1 by executing control programs stored in the flash memory 11 or RAM 12. The flash memory 11 is a non-volatile memory storing therein various programs for execution by the CPU 10 and various data for reference by the CPU 10. The flash memory 11 includes a current memory storing therein current values (current settings or current data) of all parameters for use in signal processing. The RAM 12 is a volatile memory for use as a loading area of a program to be executed by the CPU 10 and as a working area for the CPU 10.

The waveform I/O 13, which is an interface for inputting and outputting audio signals, comprises a plurality of input ports for inputting analog and digital audio signals from external equipment, and a plurality of output ports for outputting analog and digital audio signals to external equipment as indicated by arrows in the figure. The waveform I/O 13 also includes mechanisms for performing analog-to-digital (A/D) conversion, digital-to-analog (D/A) conversion, digital conversion (i.e., format conversion), etc.

The DSP section 14 performs digital signal processing on an audio signal input from external equipment via the waveform I/O 13 on the basis of current data of various parameters stored in the current memory, by executing various microprograms in response to instructions given by the CPU 10. Then, the DSP section 14 outputs the thus-processed audio signal to external equipment via the waveform I/O 13. Examples of the signal processing performed by the DSP section 14 include mixing processing, effect impartment processing and sound volume level control processing.

The control unit 15, electric fader group 16 and display device 17 are user interfaces provided on an operation panel of the console of the mixer 1. The display device 17 is in the form of a touch-panel type display operable by a user or human operator to make desired inputs through touch operation on the display panel, and it can display various screens on the basis of display control signals given from the CPU 10 via the bus 19. The control unit 15 comprises a group of controls, including later-described knob controls, provided on the operation panel. The electric fader group 15 comprises a group of fader-type controls which are operable by the human operator or user and whose operating positions can be automatically controlled on the basis of drive control signals given from the CPU 10. In response to user's operation of the control unit 15, electric fader group 16 and touch-panel type display device 17, the CPU 10 adjusts current data. In this specification, operation for "adjusting (changing) current data" means changing the current data of the parameter, stored in the current memory and corresponding to the operation, to a value corresponding to the user's operation and reflecting the changed value in the DSP section 14 and display device 17. Other I/Os 8 are general-purpose interfaces for connecting the digital mixer to other peripheral equipment, such as a USB (Universal Serial Bus) terminal.

Figure 2:
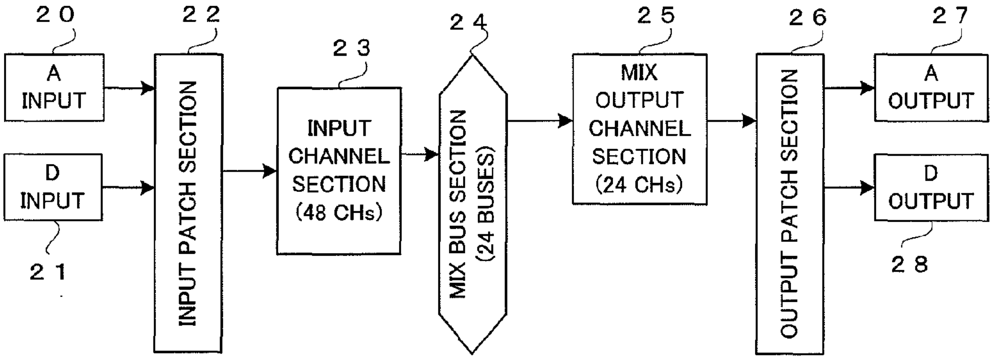
FIG. 2 is a block diagram explanatory of a construction for signal processing in the digital audio mixer of FIG. 1.

FIG. 2 is a block diagram explanatory of an example construction for audio signal processing performed on an audio signal in the mixer 1 of FIG. 1. Functions of various sections shown in FIG. 2 are implemented primarily by processing performed by the CPU 10 and microprogram processing performed by the DSP 14. An analog input section ("A input") 20 and digital input section ("D input") 21 correspond to audio signal input functions, such as audio signal input, A/D conversion and format conversion, performed by the waveform I/O 13.

On the basis of user's designation, an input patch section 22 allocates each of a plurality of input ports, provided in the A input 20 and D input 21, to any one of input channels of an input channel section 23 provided at a stage succeeding the A input 20 and D input 21.

The input channel section 23 comprises 48 (forty-eight) input channels. Each of the input channels of the input channel section 23 performs, on the basis of current data, various signal processing, such as processing pertaining to a head amp. gain, attenuator, delay, phase switch, equalizer (EQ), compressor, sound volume level, channel ON/OFF, send (or delivery) level to a MIX bus section 24 provided at a succeeding stage and panning, on an audio signal input from an input port connected thereto by the input patch section 22. The audio signal having been subjected to such signal processing is output to one or more of a plurality of buses of the MIX bus section 24.

Each of 24 (twenty-four) MIX buses of the MIX bus section 24 mixes together audio signals supplied from the input channel section 23 and outputs the mixed audio signal to a MIX output channel section 25 provided at a stage succeeding the MIX bus section 24.

The MIX output channel section 25 includes 24 (twenty-four) MIX output channels provided in corresponding relation to the 24 MIX buses of the MIX bus section 24. Each of the MIX output channels performs various signal processing, such as equalizer (EQ), compressor, sound volume level control and channel ON/OFF processing, on an audio signal input from a corresponding one of the MIX buses 24 on the basis of current data. The audio signal having been subjected to such signal processing is output to an output patch section 26 provided at a stage succeeding the MIX output channel section 25.

On the basis of user's designation, the output patch section 26 allocates each of the MIX output channels of the MIX output channel section 25 to any one of a plurality of output ports provided in an analog output (A output) section 27 and digital output (D output) section 28. The A output 27 and D output 28 correspond to audio signal output functions, such as D/A conversion, format conversion and output of an audio signal, performed by the waveform I/O 13.

Figure 3:
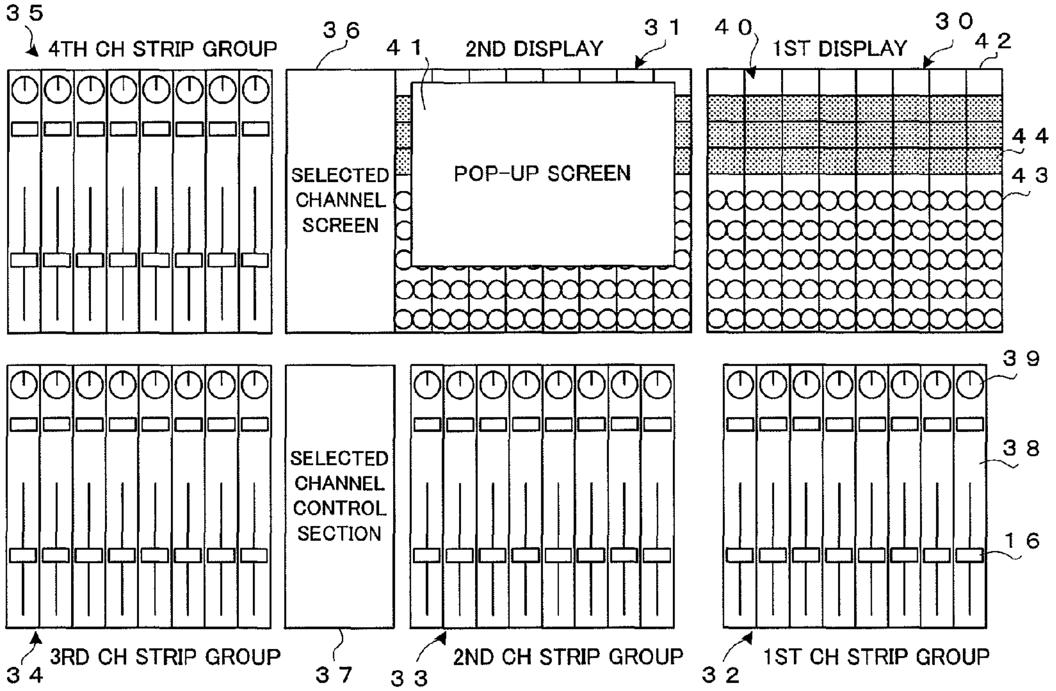
FIG. 3 is a diagram explanatory of an example construction of an operation panel of the digital audio mixer of FIG. 1.

FIG. 3 is an example construction of the operation panel of the mixer 1. On the operation panel of the mixer 1 are provided two displays 30 and 31, four channel strip groups 32 to 35, a selected channel screen display 36, and a selected channel control section 37 that corresponds to the control unit 15, electric fader group 16 and display device 17 shown in FIG. 1. Each of the channel strip groups 32 to 35 includes eight channel strips 38. To the eight channel strips 38 are allocated, in one-to-one relationship, signal processing channels (i.e., input channels and MIX output channels of consecutive channel numbers) which are to be operated on (i.e., which are objects of operation) via the channel strips 38. Let it be assumed that the allocation of the signal processing channels to the channel strips 38 is performed using the well-known technique.

Each of the channel strips 38 includes a plurality of physical controls including one electric fader 16 and one knob control 39. The user can use the electric fader 16 of the channel strip 38 to adjust current data of a sound volume level of the signal processing channel allocated to the channel strip 38. Further, the user can use the knob control 39 of the channel strip 38 to adjust current data of a parameter allocated to the knob control 39 from among various parameters of the signal processing channel allocated to the channel strip 38. Similarly, for each of the other physical controls than the electric fader 16 and knob control 39, the user can adjust current data of a parameter allocated to that other physical control from among various parameters of the signal processing channel allocated to the channel strip 38.

The above-mentioned two displays 30 and 31, which correspond to the display device 17 of FIG. 1, are each in the form of a physically independent display panel and are disposed adjacent to each other on the surface of the operation panel. Various pieces of information, such as a later-described base screen 40 and pop-up screen 41, are displayed on each of the displays 30 and 31. The first channel strip group 32 disposed near the first display 30 is associated with the first display 30, and the second channel strip group 33 disposed near the second display 31 is associated with the second display 31. In an alternative, two independent areas may be provided in one physical display panel so that the two independent display areas are used as the first and second displays 30 and 31.

The selected channel screen display 36 is a display for displaying a selected channel screen, and this display 36 is physically independent of the first and second displays 30 and 31. A plurality of parameters pertaining to one channel selected from among a plurality of signal processing channels are displayed on the selected channel screen display 36. The selected channel control section 37 include a group of controls for adjusting current data of a plurality of parameters pertaining to one channel called out to the selected channel screen display 36.

Screens displayed on the first and second displays 30 and 31 before pop-up screens are displayed (i.e., screens different from pop-up screens) are base screens 40. Typically, the base screens 40 are "main screens" displayed immediately following start-up of the mixer 1. The instant embodiment will be described, assuming that the main screens are the base screens 40.

Each of the base screens 40, which is displayed on one of the first and second displays 30 and 31, includes eight channel strip regions 42 corresponding to the eight channel strips 38 belonging to the channel strip group that is associated with the display 30 or 31. In each of the channel strip regions 42 are displayed only primary ones of parameters of the signal processing channel allocated to the corresponding channel strip 38. A displayed position of each of the channel strip regions 42 is set to form a vertical row with a corresponding one of the channel strips 38. A displayed size of each of the base screens 40 is substantially the same as a size of the entire display surface of the display panel of the corresponding display 30 or 31; namely, the base screen 40 uses the entire display region of the corresponding display 30 or 31.

Upon powering-on of the mixer 1, the first to eighth input channels are sequentially allocated to the eight channel strips 38, in a left-to-right direction, of the second channel strip group 33, the base screen 40 including the eight channel strip regions 42 that have respective information of the first to eighth input channels displayed therein is displayed on the second display 31, the ninth to sixteenth input channels are sequentially allocated to the eight channel strips 38, in a left-to-right direction, of the first channel strip group 32, and the base screen 40 including the eight channel strip regions 42 that have respective information of the ninth to sixteenth input channels displayed therein is displayed on the first display 30.

A plurality of GUI images (i.e., circular display parts) 43 provided in each of the channel strip regions 42 indicate current data of parameters of the signal processing channel allocated to the channel strip 38 corresponding to the channel strip region 42. Each of the circular display parts 43 indicates current data of a different parameter. Each of the circular display parts 43 also functions as a parameter selection switch; namely, once any one of the circular display parts 43 is touched by the user, the parameter indicated by the circular display parts 43 is allocated to the knob control 39 provided in the channel strip 38 corresponding to the channel strip region 42 which the circular display part 43 belongs to.

Three rectangular boxes (shaded portions in FIG. 3) provided in an upper section of each of the channel strip regions 42 are each a touch switch (or pop-up switch) 44 operable to instruct display of a pop-up screen. Pop-up screens pertaining to different functions, such as equalizer, head amp. and compressor functions, are associated with the three pop-up switch 44.

A pop-up screen 41 is a screen temporarily displayed, in response to the user operating any one of the pop-up switches 44; namely, the pop-up screen 41 is displayed on the base screen 40, by the so-called pop-up display method, on the display where any one of the pop-up switches 44 has been operated. In the illustrated example of FIG. 3, a pop-up screen 41 is being displayed on the second display 31.

Figure 4:
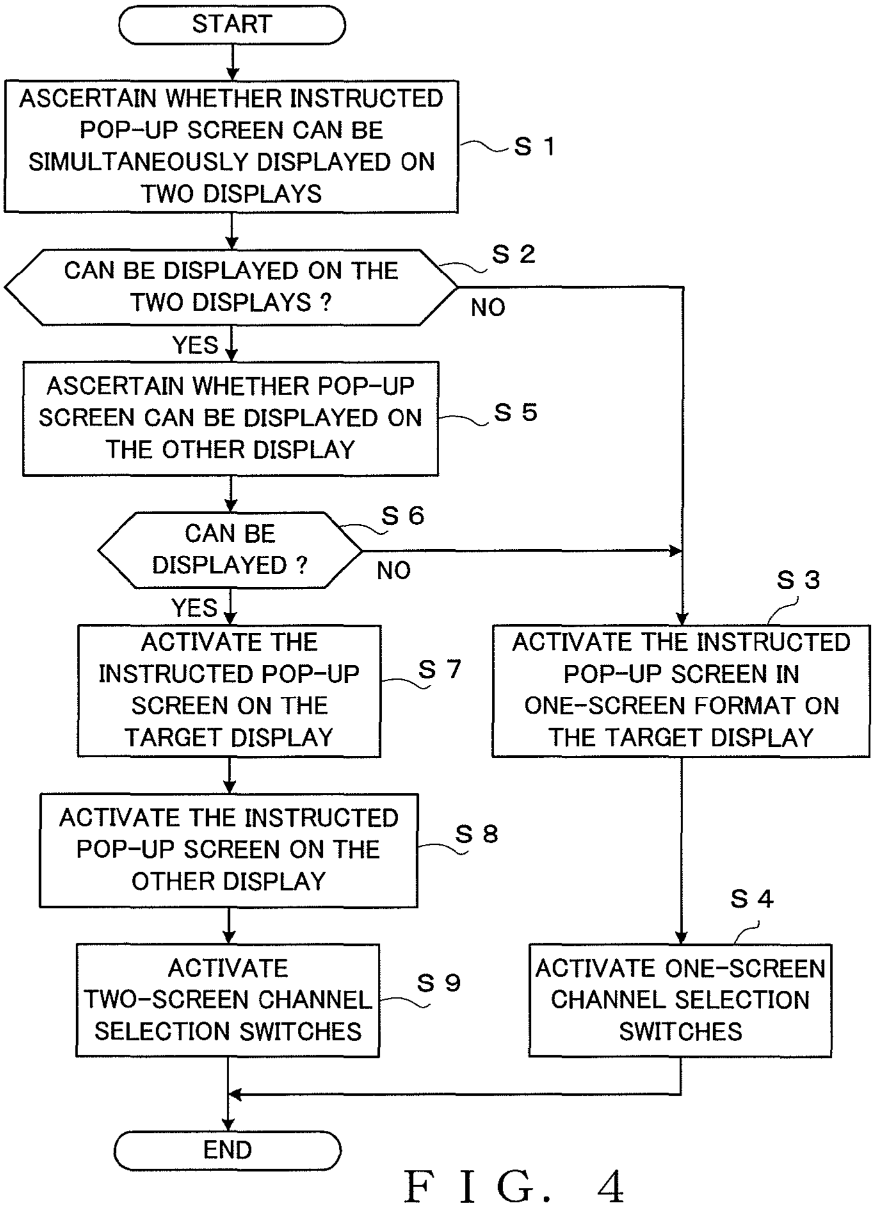
FIG. 4 is a flow chart explanatory of an example operational sequence of pop-up screen activation processing.

FIG. 4 is a flow chart explanatory of an example operational sequence of pop-up screen activation processing. Once a pop-up screen display instruction made on any one of the displays 30 and 31 is detected, i.e. once the user touches any one of the pop-up switches 44 to perform a display-instructing touch operation), the CPU 10 sets the one display 30 or 31, having received the user's display instructing touch operation, as "target display" and sets the other display 31 or 30 as "other display", and then performs the processing shown in FIG. 4.

At step S1, the CPU 10 ascertains whether the pop-up screen having been instructed to be displayed (i.e., currently instructed pop-up screen) is of a type that can be simultaneously displayed on the target display and on the other display, or of a type that should be displayed alone on the target display. Namely, in the instant embodiment, there are two types of pop-up screens: one-screen type pop-up screen (i.e., pop-up screen for one screen) to be displayed alone on the target display (i.e., pop-up screen activatable only in a one-screen format); and two-screen type pop-up screen (i.e., pop-up screen for two screens) displayable on the target display and on the other display (i.e., pop-up screen activatable not only in the one-screen format but also in a two-screen format). In the instant embodiment, for each of functions to be operated on via pop-up screens, it is defined in advance which of the above-mentioned two types the corresponding pop-up screen is of.

If the currently instructed pop-up screen (i.e., pop-up screen currently instructed to be displayed) is of the "one-screen type" that cannot be displayed in the two-screen format (NO determination at step S2), the CPU 10 proceeds to step S3, where it activates the currently instructed one-screen type pop-up screen 41 on the target display. Particularly, the CPU 10 displays the currently instructed pop-up screen 41 in the one-screen format on the target display. Note that the term "activate" a pop-up screen or switch image refers to displaying the screen or image on the display, allocating a target parameter (i.e., parameter to be operated on) to the screen or image to a physical control, allocating as necessary the target parameter to a physical control and placing the screen or image in an operable state. The pop-up screen 41 is a screen for displaying and editing current data of various setting parameters of a particular signal processing function for which display has been instructed or function corresponding to a user-touched pop-up switch 44, and the pop-up screen 41 simultaneously displays pieces of information of eight channels on the single screen.

At step S4, the CPU 10 activates later-described "one-screen channel selection switches" on the pop-up screen 41 activated at step S3. The pop-up screen 41, which is of the one-screen type simultaneously displaying pieces of information of a plurality of channels on the single screen, includes "one-screen channel selection switches". Examples of the pop-up screen 41 including the one-screen channel selection switches (i.e., pop-up screen of the one-screen type simultaneously displaying pieces of information of a plurality of channels on the single screen) includes pop-up screens of various signal processing functions, such as equalizer, head amp. and compressor functions.

Figure 5:
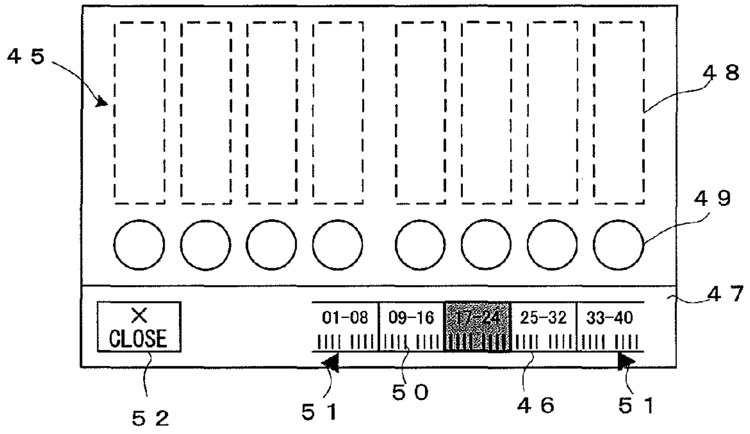
FIG. 5 is a diagram explanatory of a pop-up screen displayed on a display of the mixer.

FIG. 5 shows an example construction of the one-screen type pop-up screen 41 activated on the target display at steps S3 and S4. The pop-up screen 41 generally comprises a parameter display region 45 and a toolbar 47.

The parameter display region 45 is a region for displaying and editing current data of various setting parameters individually for eight channels. Each vertical row of a rectangular box 48 depicted by dotted line and a circular display part 49 indicate various setting parameters for one channel. The eight vertical rows (rectangular boxes 48 and circular display parts 49 for the eight channels) correspond, in one-to-one relationship, to the eight channel strips 38 belonging to the channel strip group associated with the display currently displaying the pop-up screen 41. For the function to be operated on on the pop-up screen 41, the user can edit the current data of the various setting parameters of each of the channels by use of the corresponding channel strip 38.

In the toolbar 47 are displayed one-screen channel selection switches 46 each of which is operable by the user to collectively select (i.e., switch over to) a group of eight channels to be displayed on the pop-up screen 41, i.e. the number of channels to be displayed simultaneously on the one pop-up screen. A plurality of such one-screen channel selection switches 46 are displayed in the toolbar 47 in such a manner that the user can select, on a group-by-group basis, all of the channels (i.e. the 48 input channels 23 and the 24 output channels 25 provided in the mixer 1) capable of becoming objects of operation on the pop-up screen 41.

For the one-screen display, all of the channels provided in the mixer 1 are divided into channels groups, each comprising eight channels, in increasing order of consecutive channel numbers—the 48 input channels 23 are assigned channel Nos. 1 to 48, and the 24 output channels 25 are assigned channel Nos. 49 to 73—, and each of the channels groups, each of which comprises eight channels, is set as one "channel selection unit". Further, the eight channels (of consecutive channel numbers) of each of the channel selection units are allocated to a different one of the channel selection switches 46 so that each one of the channels provided in the mixer 1 belongs to any one of the channel selection switches 46. Channel numbers ("01-08", "09-16", . . . ) indicative of the eight channels allocated to each of the channel selection switches 46 are displayed in that channel selection switch 46.

Only five such channel selection switches 46, to which are allocated consecutive channel numbers, are displayed at a time (simultaneously) in the toolbar 47, and the five channel selection switches 46 displayed in the toolbar 47 are changeable by scrolling the channel selection switches 46 leftward or rightward using a left or right cursor key 51.

Further, a group of channel strip images 50 representative of the eight channel strips 38 is displayed in each of such channel selection switches 46. More specifically, each group of channel strip images 50 comprises eight line images, and these eight line images represent eight channel strips 38 belonging to the channel strip group (first channel strip group 32 or second channel strip group 33) where pieces of information of the eight channels displayed on the pop-up screen 41 are set as objects of operation.

Only one of the channel selection switches 46 (in the illustrated example of FIG. 5, channel selection switch 46 corresponding to the channel group of channel Nos. 17-24) is placed in a selected state, and pieces of information of the eight channels corresponding to the currently selected channel selection switch 46 are displayed adjacent to one another in the parameter display region 45 of the pop-up screen 41. The currently selected channel selection switch 46 is displayed, in the middle among the five channel selection switches 46, in a display style indicating the selected state (e.g., in a color different from a color indicating a non-selected state). Also, the channel strip images (eight line images) 50 of the currently selected channel selection switch 46 are displayed in a highlighted fashion using thicker lines.

At the time of activation of the pop-up screen 41 at step S3, the CPU 10 displays pieces of information pertaining to the eight channels including the channel corresponding to the pop-up switch 44 touched by the user on the base screen 40, i.e. pieces of information pertaining to the eight channels currently displayed on the base screen 40 of the target display, in the parameter display region 45 of the pop-up screen 41, and allocates parameters, pertaining to the eight channels, to the corresponding channel strips 38 as objects of operation of the channel strips 38.

Further, at the time of activation of the channel selection switch 46 at step S4, the CPU 10 places the channel selection switch 46 which the channel corresponding to the pop-up switch 44 touched by the user on the base screen 40 belongs to (i.e. the channel selection switch 46 for selecting the eight channels currently displayed on the base screen 40 of the target display) in the selected state. Namely, the CPU 10 displays five channel selection switches 46 in the toolbar 47 in such a manner that the channel selection switch 46 placed in the selected state is located in the middle among the five channel selection switches 46 and in the display style indicating the selected state, and displays the channel strip images (eight line images) 50 of the currently selected channel selection switch 46 in the highlighted fashion.

Referring back to FIG. 4, if the currently instructed pop-up screen (i.e., pop-up screen currently instructed to be displayed) is of the "two-screen type" (YES determination at step S2), the CPU 10 proceeds to step S5, where it ascertains whether a pop-up screen can be displayed on the other display. For example, the CPU 10 ascertains whether any pop-up screen is currently being displayed on the other display. If no pop-up screen is currently being displayed on the other display, the CPU 10 determines that a pop-up screen can be displayed on the other display, while, if any pop-up screen is currently being displayed on the other display, the CPU 10 determines that no pop-up screen can be displayed on the other display. If no pop-up screen can be displayed on the other display (NO determination at step S6), the CPU 10 displays, at steps S3 and S4, the currently instructed pop-up screen only on the target display in the one-screen format (FIG. 5) rather than in the two-screen format (FIG. 6) even if the currently instructed pop-up screen is of the two-screen type. Then, the CPU 10 activates the one-screen channel selection switchers 46 on the displayed pop-up screen 41.

If the currently instructed pop-up screen is of the two-screen type (YES determination at step S2) and if a pop-up screen can be displayed on the other display (YES determination at step S6), the CPU 10 goes to step S7 to activate the currently instructed pop-up screen 41 on the target display, and then goes to step S8 to activate the currently instructed pop-up screen 41 on the other display. Then, at step S9, the CPU 10 activates later-described two-screen channel selection switches in the respective toolbars 47 of the pop-up screens 41 displayed on the target and other displays at steps S7 and S8. Namely, in this case, the currently instructed pop-up screen is activated in the two-screen format on individual ones of the target display and other display, i.e. one pop-up screen on each of the displays.

The two two-screen type pop-up screens 41 activated at steps S7, S8 and S9 above each display, for eight channels, current data of various setting parameters of the same signal processing function, and thus, the two two-screen type pop-up screens 41 together function as a pop-up screen simultaneously displaying pieces of information of a total of 16 channels. Each of the two two-screen type pop-up screens 41 is similar to the one-screen type pop-up screen 41 of FIG. 5 displayed at steps S3 and S4, except that the later-described "two-screen channel selection switches" are displayed, as the channel selection switches, in place of the "one-screen channel selection switches 46". With the two two-screen type pop-up screens 41 displayed adjacent to each other on the displays 30 and 31, the user can adjust, on a channel-by-channel basis, the current data of the various setting parameters of the signal processing function (equalizer, head amp., compressor, or the like) displayed on the two screens 41 while checking balance among the 16 channels.

At the time of activation of the two-screen type popup screens 41, i.e. at steps S7 and S8, the CPU 10 displays, eight channels by eight channels, pieces of information of 16 channels (of consecutive channel numbers), including the eight channels of the base screen 40 touched by the user, in the respective parameter display regions 45 of the pop-up screens 41 of the target display and the other display. Also, the CPU 10 allocates parameters pertaining to the 16 channels to the corresponding channel strips 38 as objects of operation of the channel strips 38.

As an example, channel allocation to the corresponding channel strips 38 at the time of the activation of the two-screen type pop-up screens 41 may be performed as follows. In the construction where the 16 channels of the consecutive channel numbers are displayed on the respective base screens 40 of the first and second displays 30 and 31, the CPU 10 allocates, at the time of the activation of the two-screen type pop-up screens 41, the eight channels, displayed on each of the base screens 40, to the pop-up screen 41 pop-up displayed on the base screen 40. As another example, the CPU 10 identifies, at the time of the activation of the two-screen type pop-up screens 41, the 16 channels of the consecutive channel numbers including the eight channels of the user-touched base screen 40, and not only allocates one group of eight channels, extracted in the increasing order of the channel numbers from among the identified 16 channels, to the pop-up screen 41 of the second display 31 but also allocates another group of the remaining eight channels (of greater channel numbers than those of the one group) of the identified 16 channels, to the pop-up screen 41 of the first display 30.

Figure 6:
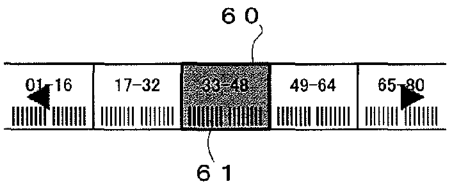
FIG. 6 is a diagram explanatory of two-screen channel selection switches displayed on a two-screen type pop-up screen.

FIG. 6 shows the "two-screen channel selection switches" displayed on the two-screen type pop-up screen at step S9 above. The two-screen channel selection switches 60 are each a switch for collectively selecting (switching to) 16 channels to be displayed on a total of two two-screen pop-up screens 41 displayed on the target display and on the other display, namely, one pop-up screen 41 on each of the displays. A plurality of such two-screen channel selection switches 60 are provided in such a manner that the user can select, group by group, all of the channels (i.e. the 48 input channels 23 and the 24 output channels 25 provided in the mixer 1) capable of becoming objects of operation on the pop-up screens 41. For the two-screen display, all of the channels provided in the mixer 1 are divided into channels groups, each comprising 16 channels, in the increasing order of consecutive channel numbers—the 48 input channels are assigned channel Nos. 1 to 48, and the 24 output channels are assigned channel Nos. 49 to 73—, and each of the channels groups, each of which comprises 16 channels, is set as one channel selection unit; namely, in this case, the channel-selection unit is 16 channels. Further, the 16 channels (of consecutive channel numbers) of each of the channel-selection units is allocated to a different one of the two-screen channel selection switches 60 so that each one of the channels provided in the mixer 1 belongs to any one of the channel selection switches 60. Only five such two-screen channel selection switches 60, to which are allocated consecutive channel numbers, are displayed at a time (or simultaneously) in the toolbar 47, and the five two-screen channel selection switches 60 displayed in the toolbar 47 are changeable by scrolling the channel selection switches 46 using any one of the left and right cursor keys 51.

Further, a group of channel strip images 61 representative of the 16 channel strips 38 is displayed in each of the two-screen channel selection switches 60. More specifically, each group of channel strip images 61 comprises 16 line images. Of the channel strip images 61 (16 line images) of each of the two-screen channel selection switches 60, the eight line images located on a right side portion of the channel selection switch 60 represent the eight channel strips 38 belonging to the first channel strip group 32 associated with the first display 30, while the eight line images located on a left side portion of the channel selection switch 60 represent the eight channel strips 38 belonging to the second channel strip group 33 associated with the second display 31.

Only one of the two-screen channel selection switches 60 (in the illustrated example of FIG. 6, the channel selection switch 60 corresponding to the channel group of channel Nos. 33-48) is placed in the selected state, and pieces of information of the 16 channels corresponding to the currently selected channel selection switch 60 are displayed in the respective parameter display regions 45 of the two two-screen pop-up screens 41 displayed on the target display and on the other display, i.e. one two-screen pop-up screen 41 per display. The currently selected channel selection switch 46 is displayed, in the middle among the five channel selection switches 60 in the toolbar 47, in a display style indicating the selected state (i.e., in a color different from a color indicating the non-selected state).

Also, of the channel strip images (16 line images) 61 of the currently selected channel selection switch 60, the eight line images representative of the channel strip group (first or second channel strip group 32 or 33) corresponding to the display (first or second display 30 or 31) on which the selected channel selection switch 60 is currently displayed are displayed in a highlighted fashion, for example, using thicker lines. Namely, the eight line images located on the right side portion (i.e., channel strip images representative of the first channel strip group 32) of the currently-selected channel selection switch 60 on the pop-up screen 41 displayed on the first display 30 are displayed in the highlighted fashion in the currently-selected channel selection switch 60. Similarly, the eight line images located on the left side portion (i.e., channel strip images representative of the second channel strip group 33) of the currently-elected channel selection switch 60 on the pop-up screen 41 displayed on the second display 31 are displayed in the highlighted fashion in the currently-selected channel selection switch 60. In the illustrated example of FIG. 6, the eight line images located on the left side portion of the currently-selected channel strip images 61 are displayed in the highlighted fashion. From the highlighted display of the channel strip images 61, the user can readily visually recognize of which one of the first channel strip group 32 and second channel strip group 33 the pieces of information of the eight channels displayed on the pop-up screen 41, currently displaying the channel selection switch 60 in question, are objects of operation.

At the time of the activation of the two-screen channel screen switch 60, namely, at step S9, the CPU 10 displays the channel selection switch 60, corresponding to the 16 channels including the eight channels of the touched base screen 40, in the display style indicating the selected state, and not only displays, in the highlighted fashion, the eight line images located on the right side portion (i.e., channel strip images representative of the first channel strip group 32) of the channel strip images 61 for the currently-selected channel selection switch 60 on the first display 30 but also displays, in the highlighted fashion, the eight line images located on the left side portion (i.e., channel strip images representative of the second channel strip group 33) of the channel strip images 61 for the currently-selected channel selection switch 60 on the second display 31.

Figure 7:
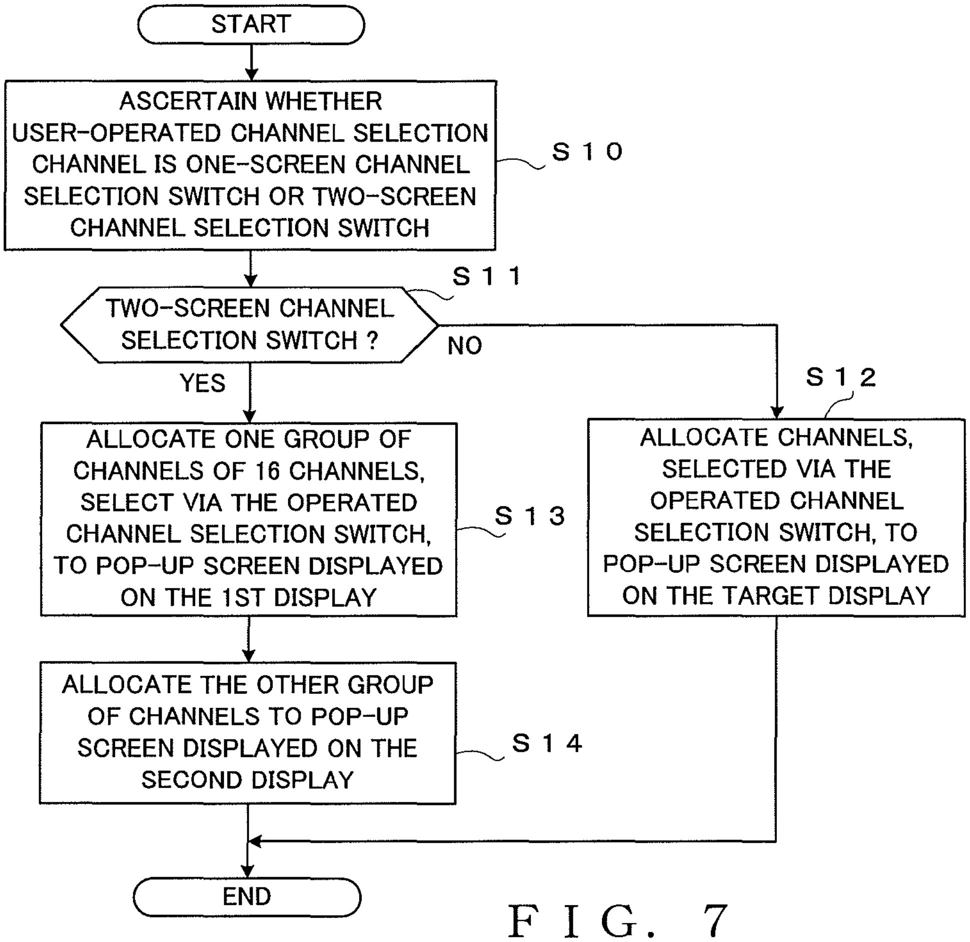
FIG. 7 is a flow chart showing an example operational sequence of channel selection processing performed in response to operation of any one of the channel selection switches.

By touching or operating any one of the channel selection switches 46 or 60 on the pop-up screen 41, the user can make an instruction for selecting (switching to) a group of channels to be displayed on the pop-up screen 41. FIG. 7 shows an example operational sequence of channel selection processing performed by the CPU 10 in response to detection of such an instruction for selecting a group of channels to be displayed on the pop-up screen 41.

At step S10, the CPU 10 ascertains whether the current user-operated channel selection switch is one of the one-screen channel selection switches 46 or the two-screen channel selection switches 60. If the current user-operated channel selection switch is one of the one-screen channel selection switches 46 (NO determination at step S11), the CPU 10 branches to step S12, where it not only displays pieces of information of the eight channels (of consecutive channel numbers), designated or selected via the operated channel selection switch, in the parameter display region 45 of the pop-up screen 41 of the target display but also allocates the pieces of information of the eight channels to the channel strip group, associated with the target display, as objects of operation. Further, the CPU 10 changes the display style of the currently-selected channel selection switch 46 into the one indicative of the selected state, but also changes the channel strip images 50 of the currently-selected channel selection switch 46 into the highlighted display.

If, on the other hand, the user-operated channel selection switch is one of the two-screen channel selection switches 46 (YES determination at step S11), the CPU 10 proceeds to step S13, where it not only displays pieces of information of the eight channels (of greater consecutive channel numbers) of 16 channels, selected via the operated channel selection switch 60, in the parameter display region 45 of the pop-up screen 41 of the first display 30 but also allocates the pieces of information of the eight channels to the first channel strip group 32 as objects of operation of the channel strip group 32. Further, the CPU 10 changes the display style of the currently-selected channel selection switch 60 into the one indicative of the selected state, and changes eight channel strip images 61 (eight line images on the right side portion of FIG. 6), included in the channel strip images 61 of the selected channel selection switch 60 and representative of the first channel strip group 32, into the highlighted display.

Further, at step S14, the CPU 10 displays pieces of information of the other eight channels (of eight smaller consecutive channel numbers), included in the 16 channels selected via the operated channel selection switch 60 and associated with the second display 31, in the parameter display region 45 of the pop-up screen 41 of the second display 31, but also allocates the pieces of information of the eight channels to the second channel strip group 33 as objects of control of the channel strip group 33. Furthermore, the CPU 10 changes the display style of the currently-selected channel selection switch 60 into the one indicative of the selected state, but also changes eight channel strip images 61 (eight line images on the left side portion of FIG. 6), included in the channel strip images 61 of the selected channel selection switch 60 and representative of the second channel strip group 33, into the highlighted display.

Namely, by merely operating one of the channel selection switches 60 on any one of the two pop-up screens 41 displayed in the two-screen format, the user can collectively change the group of 16 channels to be displayed on the two pop-up screens 41 displayed in the two-screen format, promptly and accurately. Further, because either the one-screen selection switches 46 or the two-screen type channel selection switches 60 are activated in accordance with usage situations of a pop-up screen to be currently displayed, it is possible to keep optimal the channel selection unit. Therefore, in the construction where two two-screen type pop-up screens are displayed using the two displays 30 and 31, the user can readily and promptly change the group of channels to be displayed on the two pop-up screens, without paying attention to or without becoming conscious of the channel selection unit.

Note that whether or not the channel selection switches displayed on the pop-up screen 41 are for the one-screen display or for the two-screen display has already been determined at the time of activation of the pop-up screen 41 (at steps S3, S4, S7, S8 and S9). Thus, the instant embodiment may be constructed in such a manner that the CPU 10 performs the operation(s) of step S12 or steps S13 and S14 without performing the operations of steps S10 and S11.

Note that a close switch 52 displayed in the toolbar 47 shown in FIG. 5 is operable to instruct closing of the pop-up screen. Once the close switch 52 is operated by the user on the one-screen type pop-up screen 41, the CPU 10 performs an operation for closing the pop-up screen 41. Further, once the close switch 52 is operated by the user on any one of the two-screen type pop-up screens 41 displayed in the two-screen format, the CPU 10 performs an operation for closing both of the pop-up screens 41.

Note that steps S5 and S6 shown in FIG. 4 may be modified as follows. When another pop-up screen is being displayed on the "other display", the CPU 10 may turn off the other pop-up screen and jump over step S6 to step S7 and subsequent steps to display the currently instructed pop-up screen 41 in the two-screen format on both the target display and the other display. As still another modification of steps S5 and S6, the user may be caused to make a selection, using a dialog display or the like, as to whether two two-screen type pop-up screens should be displayed with the other pop-up screen of the other display erased or turned off or a one-screen type pop-up screen should be displayed without the other pop-up screen of the other display being turned off, so that processing corresponding to the user's selection is performed. As still another modification, whether two-screen type pop-up screens should be displayed with the other pop-up screen of the other display turned off or a one-screen type pop-up screen should be displayed without the other pop-up screen of the other display being turned off may be determined in advance depending on the type of the other pop-up screen (e.g., type of signal processing function corresponding to the other pop-up screen).

As another modification, the embodiment of the present invention may be provided with three or more displays so that all or some of the displays can be used. Pop-up screens equal in number to the displays which are actually used may be activated in a similar manner to the aforementioned embodiment where two displays are used. Where a plurality x (three or more) displays are provided, all of the other displays (x−1 displays) than the target display are set as "other displays", and, once an instruction is given for displaying an x-screen (plurality-of-screen) type pop-up screen, the CPU 11 ascertains, at steps S5 and S6 of FIG. 4, whether the currently instructed pop-up screen can be displayed on all of the other displays in a plurality-of-screen format. If it has been ascertained that the currently instructed x-screen type pop-up screen can be displayed on all of the other displays, the instructed x-screen type pop-up screen including x-screen selection switches is displayed, at steps S7, S8 and S9, in a plurality-of-screen form on individual ones of the x displays. If, on the other hand, it has been ascertained that the instructed x-screen type pop-up screen cannot be displayed on any of the other displays, the instructed x-screen type pop-up screen is displayed in the one-screen format at steps S3 and S4. As another modification, once an instruction is given for displaying a plurality-of-screen type pop-up screen, the CPU 11 at steps S5 and S6 extracts, from among the other displays, two or more displays capable of displaying a pop-up screen (i.e., two or more displays that are not currently displaying other pop-up screens), and displays, at steps S7, S8 and S9, the instructed x-screen pop-up screen, including the plurality-of-screen selection switches, in the plurality-of-screen format on individual ones of the extracted displays.

Note that, in the mixer 1 to which are applied the basic principles, the console (operation panel), waveform I/O 13 and signal processing section 14 may be accommodated in one casing. Alternatively, the mixer 1 may be constructed as a mixing system where devices having respective independent functions are interconnected via a network. Further, the console (operation panel) may comprise a combination of functionally-independent hardware components, such as displays, channel strip groups, etc.

The present application is based on, and claims priority to, Japanese Patent Application No. 2010-164122 filed on Jul. 21, 2010. The disclosure of the priority application, in its entirety, including the drawings, claims, and the specification thereof, is incorporated herein by reference.

What is claimed is:

1. An audio mixing console for performing operation pertaining to signal processing on audio signals of a plurality of channels, said audio mixing console comprising:
   a display device; and
   a processor configured to:
      receive a display instruction for displaying a pop-up screen on the display device;
      ascertain whether or not a plurality of pop-up screens are to be displayed on the display device, each of the plurality of pop-up screens adapted to simultaneously display pieces of information of one group of a predetermined plurality of the plurality of channels; and
      1) when the plurality of pop-up screens are not displayed on the display device, display only one pop-up screen and a one-pop-up-screen channel selection switch on the display device, said one-pop-up-screen channel selection switch adapted to select a group of the predetermined plurality of the plurality of channels whose pieces of information are to be displayed on said one pop-up screen, and 2) when the plurality of pop-up screens are displayed on the display device, display the plurality of pop-up screens and a plurality-of-pop-up-screen channel selection switch, said plurality-of-pop-up-screen channel selection switch adapted to collectively select a predetermined plurality of groups of the predetermined plurality of the plurality of channels whose pieces of information are to be displayed on the plurality of pop-up screens, said plurality-of-pop-up-screen channel selection switch adapted to collectively select the predetermined plurality of groups from among a plurality of groups of the predetermined plurality of the plurality of channels,
   wherein said one-pop-up-screen channel selection switch is operable to display, on the display device, channel strip images representative of channel strips corresponding to the predetermined plurality of the plurality of channels selected through the operation of the one-pop-up-screen channel selection switch, and
   said plurality-of-pop-up-screen channel selection switch is operable to display, on the display device, channel strip images representative of channel strips corresponding to the predetermined plurality of groups of the predetermined plurality of the plurality of channels selected through the operation of the plurality-of-pop-up-screen channel selection switch.

2. A computer-implemented method for controlling display on an audio mixing console, the audio mixing console being operable to perform operation pertaining to signal processing on audio signals of a plurality of channels, said method comprising:
   receiving a display instruction for displaying a pop-up screen on a display device;
   in response to receipt of the display instruction, ascertaining whether or not a plurality of pop-up screens are to be displayed on the display device, each one of the plurality of pop-up screens adapted to simultaneously display pieces of information of one group of a predetermined plurality of the plurality of channels; and
   1) when the plurality of currently instructed pop-up screens are not displayed on the display device, displaying only one pop-up screen and a one-pop-up-screen channel selection switch on the display device, said one-pop-up-screen channel selection switch adapted to select a group of the predetermined plurality of the plurality of channels whose pieces of information are to be displayed on said one pop-up screen, and 2) when the plurality of pop-up screens are displayed on the display device, displaying the plurality of pop-up screens and a plurality-of-pop-up-screen channel selection switch, said plurality-of-pop-up-screen channel selection switch adapted to collectively select a predetermined plurality of groups of the predetermined plurality of the plurality of channels whose pieces of information are to be displayed on the plurality of pop-up screens, said plurality-of-pop-up-screen channel selection switch adapted to collectively select the predetermined plurality of groups from among a plurality of groups of the predetermined plurality of the plurality of channels,
   wherein said one-pop-up-screen channel selection switch is operable to display, on the display device, channel strip images representative of channel strips corresponding to the predetermined plurality of the plurality of channels selected through the operation of the one-pop-up-screen channel selection switch, and
   said plurality-of-pop-up-screen channel selection switch is operable to display, on the display device, channel strip images representative of channel strips corresponding to the predetermined plurality of groups of the predetermined plurality of the plurality of channels selected through the operation of the plurality-of-pop-up-screen channel selection switch.

3. A non-transitory computer-readable storage medium containing a group of instructions for causing a computer to perform a method for controlling display on an audio mixing console, the audio mixing console being operable to perform operation pertaining to signal processing on audio signals of a plurality of channels, said method comprising:
   receiving a display instruction for displaying a pop-up screen on a display device;
   in response to receipt of the display instruction, ascertaining whether or not a plurality of pop-up screens are to be displayed on the display device, each one of the plurality of pop-up screens adapted to simultaneously display pieces of information of one group of a predetermined plurality of the plurality of channels; and
   1) when the plurality of currently instructed pop-up screens are not displayed on the display device, displaying only one pop-up screen and a one-pop-up-screen channel selection switch on the display device, said one-pop-up-screen channel selection switch adapted to select a group of the predetermined plurality of the plurality of channels whose pieces of information are to be displayed on said one pop-up screen, and 2) when the plurality of pop-up screens are displayed on the display device, displaying the plurality of pop-up screens and a plurality-of-pop-up-screen channel selection switch adapted to collectively select a predetermined plurality of groups of the predetermined plurality of the plurality of channels whose pieces of information are to be displayed on the plurality of pop-up screens, said plurality-of-pop-up-screen channel selection switch adapted to collectively select the predetermined plurality of groups from among a plurality of groups of the predetermined plurality of the plurality of channels, wherein said one-pop-up-screen channel selection switch is operable to display, on the display device, channel strip images representative of channel strips corresponding to the predetermined plurality of the plurality of channels selected through the operation of the one-pop-up-screen channel selection switch, and said plurality-of-pop-up-screen channel selection switch is operable to display, on the display device, channel strip images representative of channel strips corresponding to the predetermined plurality of groups of the predetermined plurality of the plurality of channels selected through the operation of the plurality-of-pop-up-screen channel selection switch.

* * * * *